(12) United States Patent
Walsh

(10) Patent No.: US 6,817,077 B2
(45) Date of Patent: Nov. 16, 2004

(54) PART SORTER AND SELECTOR

(75) Inventor: Matthew J. Walsh, Hicksville, NY (US)

(73) Assignee: Walsh-Atkinson Company, Inc., Hicksville, NY (US)

( * ) Notice: Subject to any disclaimer, the term of this patent is extended or adjusted under 35 U.S.C. 154(b) by 546 days.

(21) Appl. No.: 10/006,766

(22) Filed: Dec. 6, 2001

(65) Prior Publication Data

US 2003/0106842 A1 Jun. 12, 2003

(51) Int. Cl.$^7$ .......................... B23P 21/00; G06F 19/00
(52) U.S. Cl. .............................. 29/407.01; 29/407.09; 29/407.1; 29/702; 29/703; 29/428; 209/509; 700/96; 700/97; 700/116
(58) Field of Search .................. 29/407.01, 407.09, 29/407.1, 428, 702, 703, 709, 771; 209/509, 606, 931, 3.3, 546; 700/115, 116, 182, 97, 96, 171, 173

(56) References Cited

U.S. PATENT DOCUMENTS

| | | | | |
|---|---|---|---|---|
| 5,933,353 A | * | 8/1999 | Abriam et al. | 700/182 |
| 6,289,254 B1 | * | 9/2001 | Shimizu et al. | 700/96 |
| 6,434,441 B1 | * | 8/2002 | Beauchamp et al. | 700/98 |
| 6,647,305 B1 | * | 11/2003 | Bigelow | 700/97 |

FOREIGN PATENT DOCUMENTS

| | | | | | |
|---|---|---|---|---|---|
| JP | 05111834 A | * | 5/1993 | ........... | B23P/21/00 |
| JP | 06315856 A | * | 11/1994 | ........... | B23Q/41/08 |

* cited by examiner

Primary Examiner—David P. Bryant
Assistant Examiner—Jermie E. Cozart
(74) Attorney, Agent, or Firm—Charles E. Baxley

(57) ABSTRACT

An apparatus and method for sorting and selecting parts comprising a computer for designing a plurality of a first type of component parts and a plurality of a second type of component parts. Each job, which consists of the plurality of first component parts and the plurality of second component parts, is assigned a unique identification by the computer. In addition, the computer also assigns a part identification for each of the component parts. A first tooling machine computer-controller, coupled to the computer, receives the plurality of first component part designs, creates tooling instructions for the first component parts, and creates labels for each of the first component parts. The labels include the unique job identification and the part identification. A first tooling machine, coupled to the first tooling machine computer-controller, receives the first component part tooling instructions, receives material for the first component parts, and creates the first component parts. A second tooling machine computer-controller, coupled to the computer, receives the second component part designs, inputs the unique job identification, inputs the part identifications for at least one of the newly created first component parts, and creates tooling instructions for the second component parts. A second tooling machine, coupled to the second tooling machine computer-controller, receives the second component part tooling instructions, receives material for the second component parts, and creates the second component parts for each of the inputted first component part identifications, thereby grouping associated parts during the manufacturing process.

16 Claims, 1 Drawing Sheet

PART SORTER AND SELECTOR

FIELD OF THE INVENTION

The present invention generally relates to the filed of part sorting and selection and more particularly to a method and apparatus for sorting and selecting component parts during a manufacturing process to improve efficiency and productivity.

BACKGROUND OF THE INVENTION

Sorting and selection devices can be integrated with many types of machines. One type of sorting device is coupled to the output of a tooling machine for separately guiding finished parts to different discharge areas adjacent to the tooling machine. Here, the sorting device is a post-processing tool that is utilized to sort finished pieces. However, this type of sorting device does not perform pre-sorting of the material to process, and therefore does not insure that associated parts arrive at the tooling machine together thereby improving efficiency of the manufacturing process.

Another type of sorting and selection device operates on the parts or material arriving at a processing station. Here parts can be identified on the basis of the quality of the material or the type of material. For example, only parts processing a similar quality of material would be selected and processed together. The processing station typically performs similar operations on similar types of parts. There is little flexibility in the processing station. Different sizes, shapes, and types of parts are not readily accommodated. A considerable level of control is required to sort the parts with associated costs and complexity.

Accordingly, there is a need to provide a simple and efficient sorting and selecting system that brings a variety of associated parts and pieces together during a production process with resulting improvements in efficiency and productivity.

SUMMARY OF THE INVENTION

The present invention teaches a system for sorting and selecting parts. The disclosed invention provides a computer for designing a first type of component part and a second type of component part. Each job, which consists of a set of the first component parts and a set of the second component parts, is assigned a unique identification by the computer. In addition, the computer also assigns part identifications for the each of the component parts. A first tooling machine computer-controller, coupled to the computer, receives the first component part designs, creates tooling instructions for the first component parts, and creates labels for each of the first component parts. The labels include the unique job identification and the associated part identification. A first tooling machine, coupled to the first tooling machine computer-controller, receives the tooling instructions, receives material for the first component parts, and creates the first component parts. A second tooling machine computer-controller, also coupled to the computer, receives the second component part designs and creates tooling instructions for the second component parts. The user loads into the second tooling machine computer-controller the unique job identification and inputs the part identification for at least one of the newly created first component parts. This arrangement insures that the first component part and its associated second component part are in physical proximity. The second tooling machine, coupled to the second tooling machine computer-controller, receives the tooling instructions and second component part material and then creates the second component parts. Because second component parts are only created for each of the inputted first component part identifications, only those parts that are associated with a specific job are grouped together during the manufacturing process.

In an exemplary embodiment of the present invention, the first tooling machine computer-controller is configured to replace the computer, thereby enabling a reduction in cost while maintaining the same functionality.

In another exemplary embodiment of the present invention, the part sorter and selector includes a bar code representation of the unique job identification and part identification. This arrangement enables the user to scan the label and thereby input the identifications of component parts into the respective tooling machines quickly and efficiently. By also including the corresponding bar code numbers on the labels, the identifications can be entered alternatively into the tooling machines manually, thereby allowing continued operation despite defective bar codes scanners or illegible bar codes.

In another exemplary embodiment of the present invention, the part sorter and selector employ a first tooling machine computer-controller and a second tooling machine computer-controller that can nest or optimize the placement of the component part designs on the material. This arrangement insures that material is processed efficiently with minimal amounts of material waste.

In another exemplary embodiment of the present invention, the part sorter and selector can be used in an iterative manner. Here, a first job with the present invention produces first component parts and second component parts as previously described. The first component parts and second component parts are then combined to form a fitting. A second job is processed by inputting the fitting along with any required first component parts and second component parts. Because the second job is different from the first, it is assigned its own unique job identification. The fitting, which previously was labeled with the identification of the first job, now is labeled with the identification of the second job, losing all associations with the first job. The fitting can be combined with the newly created first and second component parts to form a new fitting that can be processed subsequently in additional jobs, with new unique job identifications.

Advantageously, the present invention improves productivity of tooling machines. By designing a flexible part sorting and selecting system, the present invention is employed on any machine where a user is required to identify parts and group them together at different stages of the manufacturing process. The present invention is a powerful solution to improving efficiency of part sorting, selecting, and grouping.

BRIEF DESCRIPTION OF THE DRAWING

A more complete understanding of the present invention will be obtained from consideration of the following description in conjunction with the drawing in which.

DETAILED DESCRIPTION

Figure 1:
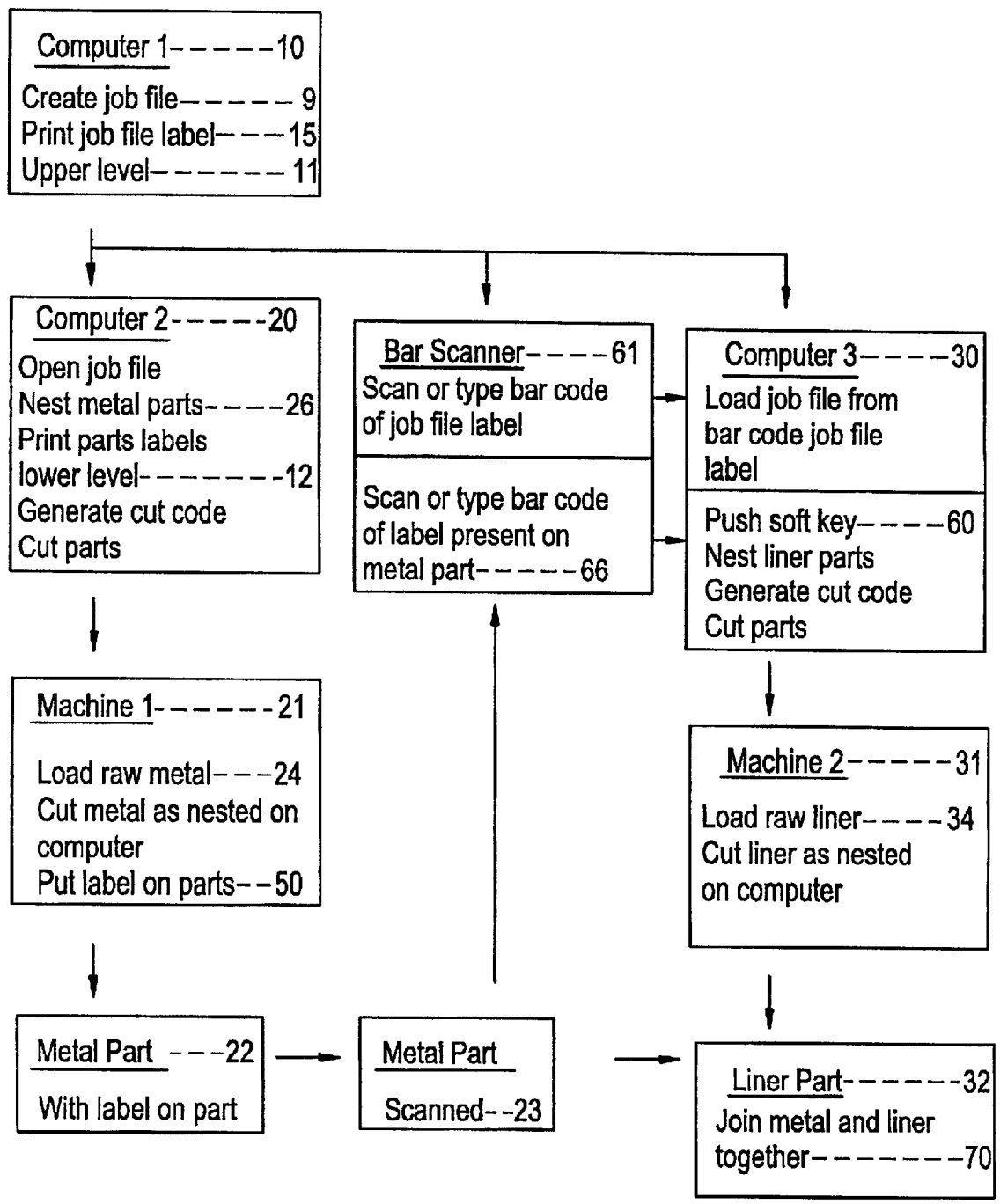
FIG. 1 is an illustration of an exemplary part sorter and selector.

The exemplary part sorting and selecting system can be seen in FIG. 1. The part sorting and selecting system comprises a plurality of components including a plurality of computers, a first tooling machine for processing a first type of component parts, and a second tooling machine for processing a second type of component parts. These system elements are integrated to achieve their desired objective of providing an effective means to efficiently sort, select, and re-group parts.

The exemplary part sorting system includes a computer 10. The computer 10 is employed to design all of the component parts that require sorting. When inputting the design of the component parts, a user provides a detailed description of the component part and its geometry, enabling the computer 10 to calculate the weight and area and thus, the amount of material required to create the component part.

The component parts are generally created from two types of materials. In one exemplary embodiment of the present invention, the material for the first type of component part 22 is metal while the second type of component part 32 is created from a liner material such as those found in materials for reducing sound in air ventilating systems. In this instance, the metal can be used to manufacture an air duct while liner material is cut to fit into the associated air duct and reduce the sound. The ability to sort these associated components and bring them back together at different stages of the manufacturing process is a key attribute of the present invention.

As the first type of component parts and the second type of component parts are created on the computer 10, they are assigned identifications. Identification is based on two levels. On a higher level, each job is assigned a unique identification. A job consists of one or more of the first type of component parts in addition to one or more of the second type of component parts. Each of the component parts that comprise the job share the same unique job identification. On a lower lever, each of the component parts is provided a part identification. Thus, if a job of manufacturing an air duct required parts consisting of a metal throat, heel, bottom, and top, each of those component parts is assigned a part identification by the computer 10 in addition to being assigned the same job identification. Because all of the component parts share the same unique job identification, they are grouped easily and effort is not wasted in tracking down parts for jobs. Moreover, the job identification can be printed onto a label 15 to facilitate easy retrieval from the computer 10 of all of the information associated with that specific job.

Once the jobs and component parts have been defined in the computer 10 and the identifications have occurred, the component part descriptions is downloaded to their respective tooling machine computer-controllers 20, 30. Thus, the first tooling machine computer-controller 20 and the second tooling machine computer-controller 30 are both coupled electronically to the computer 10. A preferred coupling is a communications link although this coupling can also be realized through an exchange of a memory media such as a floppy disk. The first tooling machine computer-controller 20 is coupled electronically to the first tooling machine 21 while the second tooling machine computer-controller 30 is coupled electronically to the second tooling machine 31. In a preferred embodiment, the first tooling machine 21 is a metal cutting machine while the second tooling machine 31 is a liner cutting machine. Upon receiving the downloaded information, the first tooling machine computer-controller 20 determines the amount of first material 24 required for creating the downloaded, first type of component parts 22. In one embodiment, the present invention nests or optimizes the material yield. The amount of the first material 24 required for the job is based on the first type of component parts 22 being optimally placed or nested to maximize the yield during the tooling process. After completing the placing of the first type of component parts 22, the first tooling machine computer-controller 20 generates instructions for the first tooling machine 21 to process the first material 24. Next, the first material 24 is fed into the first tooling machine 21 and the tooling is completed with the first material 24 yielding the first type of component parts 22. In an exemplary embodiment, the first tooling machine computer-controller 20 is configured and programmed to include the functionality of computer 10, thereby eliminating the need for computer 10 and enabling a reduction in cost.

Identification can be affixed to the first type of component parts 22, wherein the identification includes both the unique job identification as well as the part identification. In an exemplary embodiment, the first tooling machine computer-controller 20 prints labels 50 that are affixed to the first type of component parts 22 and that include both the unique job identification and part identification. The part labels 50 further includes a bar code representative of the unique job identification and part identification. Because of the potential size of a first tooling machine 21 and the number of component parts, zone locations are included in the part label 50 to expedite the process of locating the first type of component part 22.

Upon completion of the processing of the first type of component part 22, the user groups the first type of component parts 22 for each unique job and moves to the second tooling machine 31. The user then enters the job label 15 information as well as the needed part labels 50 into the second tooling machine computer-controller 30. Because the second type of component parts 32 are normally only created for an associated first type of component part 22, as described in an earlier example of a metal air duct and associated liner, it is necessary to input the part label 50 information for all of the first type of component parts 22 associated with the second type of component parts 32. In addition, if a bar code representation is included on the labels, the user can employ a bar code scanner 61 to read the job label 15 and the part labels 50.

After receiving the label information, the second tooling machine computer-controller 30 downloads the component part descriptions for the second type of component part 32 associated with the entered job label 15. The second tooling machine computer-controller 30 prints out a report containing a list of all of the second type of component parts 32 associated with the unique job. By loading or scanning the part identifications of the newly tooled first type of component parts 22 into the second tooling machine computer-controller 30, the associated component parts are kept together. There is no wasted time spent trying to locate component parts.

The loading of the part identifications can be facilitated with a SoftKey 60 or programmable key at the second tooling machine computer-controller 30. Here, the user presses the SoftKey 60, thereby opening a dialog box on the second tooling machine computer-controller 30 enables the user to enter the part identification via a keyboard or alternatively, scanning it with a bar code scanner 61. As the part identifications are entered, the second type of component parts 32 are nested or placed onto the second material 34 in the second tooling machine computer-controller 30. If a bar code cannot be read by a scanner, the user simply types in the part identification. After completing the placing of the second type of component parts 32, the second tooling machine computer-controller 30 generates instructions for the second tooling machine 31 to process the second material 34. The second material 34 then is processed by the second tooling machine 31, yielding the second type of component parts 32.

The second type of component parts 32 are placed with the scanned first type of component parts 22, thereby completing the sorting and selecting process. All tooling has been completed by the tooling machines, thereby eliminating the need for inefficient manual tooling of the materials.

When the sorting and selecting of the associated component parts is complete, the parts are normally combined to create a fitting or combination of parts. If the fitting is saved and additional tooling operations are needed with the saved fitting, then the fitting is loaded into the computer 10 as part of a new job, and a new and unique job identification is assigned to the fitting and the additional component parts that are created. Because the fitting, which was previously labeled with the identification of the prior job, is now part of a new job, it is assigned the new and unique job identification, thereafter losing all association with the previous job. The user inputs the design of the new component parts, providing a detailed description of the new component parts and corresponding geometry, enabling the computer 10 to calculate weight and area and amount of material required to create the new component parts. By assigning the same job identification to the saved fitting and the new component parts, the user insures that associated fittings and parts are sorted properly and later brought together at appropriate stages in the tooling process.

Similarly, if a job is saved and then merged with another job, all the fittings and component parts get new unique job identifications while the old job identifications are removed.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. An apparatus for sorting and selecting parts, comprising;
   a computer for designing a plurality of a first type of component parts and a plurality of a second type of component parts, said plurality of first component parts and said plurality of second component parts defining a job, and wherein said computer assigns a unique job identification for said job and a part identification for each of said component parts;
   a first tooling machine computer-controller, coupled to said computer, for receiving a plurality of first component part designs, creating tooling instructions for said first component parts from said first component part designs, and creating labels for each of said first component parts, said labels including said unique job identification and said part identification;
   a first tooling machine, coupled to said first tooling machine computer-controller, for receiving said first component part tooling instructions, receiving material for said plurality of said first component parts, and creating said first component parts;
   a second tooling machine computer-controller, coupled to said computer, for receiving a plurality of second component part designs, inputting said unique job identification, inputting said part identifications for at least one of said plurality of first component parts, and creating tooling instructions for said second component parts from said second component part designs; and
   a second tooling machine, coupled to said second tooling machine computer-controller, for receiving said second component tooling instructions, receiving material for said second component parts, and creating said second component parts for each of said inputted first component part identifications.

2. The apparatus according to claim 1, wherein said first tooling machine computer-controller is configured to replace said computer.

3. The apparatus according to claim 1, wherein said first tooling machine is a metal cutting machine and said second tooling machine is a liner cutting machine.

4. The apparatus according to claim 1, wherein said label includes a bar code representation of said unique job identification and said part identification.

5. The apparatus according to claim 1, wherein said label includes a zone identification indicating location of said first component part.

6. The apparatus according to claim 1, wherein said first tooling machine computer-controller optimizes the yield of said first component part material and said second tooling machine computer-controller optimizes the yield of said second component part material.

7. The apparatus according to claim 1, wherein said created plurality of first component parts and said created plurality of second component parts are combined to form a fitting.

8. The apparatus according to claim 7, wherein said plurality of first component parts, said plurality of second component parts, and a previously created fitting define said job.

9. A method for sorting and selecting parts, comprising the steps of:
   designing a plurality of a first type of component parts and a plurality of a second type of component parts, said plurality of first component parts and said plurality of second component parts defining a job;
   assigning a unique job identification for said job;
   assigning a part identification for said each of said component parts;
   providing a first tooling machine computer-controller for receiving said plurality of first component part designs, creating tooling instructions for said first component parts from said first component part designs, and creating labels for each of said first component parts, said labels including said unique job identification and said part identification;
   providing a first tooling machine for receiving said first component part tooling instructions, receiving material for said plurality of said first component parts, and creating said first component parts;
   providing a second tooling machine computer-controller for receiving a plurality of second component part designs, inputting said unique job identification, inputting said part identifications for at least one of said plurality of first component parts, and creating tooling instructions for said second component parts from said second component part material; and
   providing a second tooling machine for receiving said second component part tooling instructions, receiving material for said second component parts, and creating said second component parts for each of said input first component part identifications.

10. The method according to claim 9, wherein said first tooling machine computer-controller is configured to facilitate said designing step, said job identification assigning step, and said part identification assigning step.

11. The method according to claim 9, wherein said first tooling machine is a metal cutting machine and said second tooling machine is a liner cutting machine.

12. The method according to claim 9, wherein each of said labels includes a bar code representation of said unique job identification and said part identification.

13. The method according to claim 9, wherein each of said labels includes a zone identification indicating location of said first component part.

14. The method according to claim 9, wherein said first tooling machine computer-controller optimizes the yield of said first component part material and said second tooling machine computer-controller optimizes the yield of said second component part material.

15. The method according to claim 9, wherein said created plurality of first component parts and said created plurality of second component parts are combined to form a fitting.

16. The method according to claim 15, wherein said plurality of first component parts, said plurality of second component parts, and a previously created fitting define said job.

* * * * *